US008281058B1

(12) United States Patent
McCorkendale et al.

(10) Patent No.: US 8,281,058 B1
(45) Date of Patent: Oct. 2, 2012

(54) SYSTEMS AND METHODS FOR USING USB DEVICE DESCRIPTORS TO IDENTIFY COMPUTING ENVIRONMENTS

(75) Inventors: Bruce McCorkendale, Manhattan Beach, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 460 days.

(21) Appl. No.: 12/581,302

(22) Filed: Oct. 19, 2009

(51) Int. Cl.
*G06F 13/00* (2006.01)
(52) U.S. Cl. ........................................ 710/104; 710/313
(58) Field of Classification Search .................. 710/104, 710/300–306, 313
See application file for complete search history.

(56) References Cited

U.S. PATENT DOCUMENTS 7,159,065 B1 * 1/2007 Marlatt ........................ 710/313
2002/0156952 A1 * 10/2002 Shono ........................... 710/104

\* cited by examiner

*Primary Examiner* — Brian Misiura
*Assistant Examiner* — Kim Huynh
(74) *Attorney, Agent, or Firm* — Advantedge Law Group

(57) ABSTRACT

An exemplary method for using USB device descriptors to uniquely identify computing environments may include: 1) detecting a set of USB devices connected to a computing device within a computing environment, 2) obtaining a USB device descriptor for each USB device within the set of USB devices, and then 3) creating an environmental signature for the computing environment that identifies the computing environment based at least in part on the USB device descriptors. Exemplary methods for using such environmental signatures to uniquely identify computing environments are also disclosed.

17 Claims, 10 Drawing Sheets

USB Device Descriptor
400

| Field | Value | Description |
|---|---|---|
| bLength | 18 | Valid Length |
| bDescriptorType | 1 | Device |
| bcdUSB | 0x0110 | USB 1.1 Specification |
| bDeviceClass | 0x00 | Defined at Interface Level |
| bDeviceSubClass | 0x00 | |
| bDeviceProtocol | 0x00 | |
| bMaxPacketSize | 8 | |
| idVendor | 0x045e | MajorSoft Corp. |
| idProduct | 0x007d | Notebook Optical Mouse |
| bcdDevice | 1.8 | Device Release Number |
| iManufacturer | 1 | MajorSoft Corp. |
| iProduct | 2 | MajorSoft Notebook Optical Mouse 1.8 |
| iSerialNumber | 0 | Serial Number Unknown |
| bNumConfigurations | 1 | Number of Possible Configurations |

*FIG. 4*

Environmental Signature 500 

```
----------------------------------------------------------------------------------------------------
****************************************************************************************************
COMPUTING ENVIRONMENT ID:  0x0001
****************************************************************************************************

****************************************************************************************************
USB DEVICES:

0xF765          // Hash of Device Descriptor for USB Device No. 1
0x12CF          // Hash of Device Descriptor for USB Device No. 2
0x39A1          // Hash of Device Descriptor for USB Device No. 3
****************************************************************************************************

****************************************************************************************************
NETWORK CHARACTERISTICS:

Gateway MAC Address:  00-B0-3D-A2-2D-1C
Default Gateway:  198.167.1.1
****************************************************************************************************

****************************************************************************************************
TEMPORAL CHARACTERISTICS:

Begin Time:  0904
End Time:  1656
Days: Monday, Tuesday, Wednesday, Thursday, Friday
****************************************************************************************************

SYSTEMS AND METHODS FOR USING USB DEVICE DESCRIPTORS TO IDENTIFY COMPUTING ENVIRONMENTS

BACKGROUND

In recent years, the increased mobility of computing devices has lead to the use of computing devices in a host of differing computing environments. For example, a user may use the same laptop at work, at a satellite work location, at home, at a friend's house, or at a café.

There are many cases where it may be useful to automatically identify the computing environment that a computing device is operating within. For example, if a particular computing environment can be reasonably identified, various software features on a computing device that should only be enabled for that particular computing environment can be restricted to that computing environment. Similarly, certain software features may be triggered upon detection of sufficient changes to a particular computing environment.

Unfortunately, many conventional approaches to identifying computing environments are overly complex and/or inefficient. Accordingly, there exists a need for systems and methods for efficiently and reliably identifying the various computing environments that a computing device operates within.

SUMMARY

As will be described in greater detail below, the instant disclosure generally relates to systems and methods for using USB device descriptors to uniquely identify the various computing environments that a computing device operates within. In one example, an exemplary method for performing such a task may include: 1) detecting a set of USB devices connected to a computing device within a computing environment, 2) obtaining a USB device descriptor for each USB device within the set of USB devices, and then 3) creating an environmental signature for the computing environment that uniquely identifies the computing environment based at least in part on the USB device descriptors.

In some examples, the environmental signature may include a hash of all or a portion (e.g., select fields such as "idVendor," "idProduct," and/or "iSerialNumber") of each USB device descriptor. The environmental signature may also contain information that identifies various network characteristics (e.g., the MAC address of an upstream gateway within the computing environment) and/or temporal characteristics (e.g., the days of the week and/or times of day when the computing device typically connects to the computing environment) of the computing environment.

The systems described herein may create environmental signatures automatically and/or in response to requests from a user of the computing device. For example, a user of a computing device may request the creation of an environmental signature for one or more of the user's computing environments. Additionally or alternatively, the various systems described herein may attempt to automatically create environmental signatures for the various computing environments that a computing device operates within based at least in part on the set of USB devices that connect to the computing device.

As will be explained in greater detail below, the various systems described herein may use environmental signatures to uniquely identify computing environments. For example, these systems may identify a particular computing environment by: 1) detecting a set of USB devices connected to a computing device, 2) obtaining a USB device descriptor from each USB device connected to the computing device, and then 3) identifying, based at least in part on the USB device descriptors, a computing environment that the computing device is connected to or operating within. In some examples, the systems described herein may then identify and perform a computing action (such as enabling or disabling a particular software feature) that is applicable to the identified computing environment.

In some examples, the systems described herein may identify a particular computing environment by determining that at least a predetermined portion of the USB device descriptors (or hashes of all or a portion of the same) obtained from the USB devices connected to the computing device are identical to USB device descriptors (or hashes of all or a portion of the same) contained within an environmental signature associated with a known computing environment.

In addition, in some examples the systems described herein may determine that a particular computing environment matches a known computing environment if the number of USB devices within the set of USB devices currently connected to the computing device is greater than a predetermined minimum and/or less than a predetermined maximum. For example, if an environmental signature associated with a known computing environment contains five USB device descriptors, then the systems described herein may determine that a particular computing environment matches this known computing environment only if the computing environment contains: 1) at least three matching USB device descriptors and 2) a total of at least three, but no more than ten, USB devices.

In one example, the systems described herein may determine whether a particular computing environment matches a known computing environment based on whether various network characteristics (e.g., the MAC address of a gateway within the computing environment) and/or temporal characteristics (such as the current time and/or date) of the computing environment match various network and/or temporal characteristics contained within an environmental signature associated with the known computing environment.

In some examples, the systems described herein may use environmental signatures to detect when a computing device has been stolen or compromised. For example, the systems described herein may detect when a computing device has been stolen by: 1) detecting a change in a computing environment of the computing device (such as the addition or removal of one or more USB devices) and then 2) determining that the change in the computing environment represents a potential security risk (by, e.g., determining that the computing device has connected to an unrecognized computing environment). In some examples, the systems described herein may then perform a security action in an attempt to secure and/or recover the stolen computing device.

For example, if the systems described herein determine that a computing device has connected to an unrecognized computing environment (i.e., a computing environment for which an environmental signature does not exist), then these systems may identify the current location of the computing device, log keystrokes on the computing device, capture screenshots of activity on the computing device, and/or monitor processes executing on the computing device. The systems may also alert a security server regarding the potential security risk and/or provide information to the security server that identifies the current location of the computing device, keystrokes logged on the computing device, screenshots captured on the computing device, and/or a list of processes executing on the computing device. These systems may also enable an owner of the computing device to remotely control the computing device, encrypt and/or prevent access to sensitive data on the computing device, disable at least one software and/or hardware feature on the computing device, and/or require the input of a password (such as a fallback password) for continued operation of the computing device.

As will be explained in greater detail below, the exemplary systems and methods described herein may uniquely identify the various computing environments that a computing device operates within by continuously obtaining, logging, and analyzing USB device descriptors from USB devices connected to the computing device. As such, these systems and methods may enable software and/or hardware vendors to enable and/or disable specific features and/or options that are only applicable to specific computing environments. Similarly, by maintaining a database of environmental signatures for known computing environments, the systems and methods described herein may enable security software to detect when a computing device has been stolen and/or perform various security operations in an attempt to secure and/or recover the stolen computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of an exemplary USB device descriptor.

FIG. 5 is a block diagram of an exemplary environmental signature for a computing environment.

Figure 1:
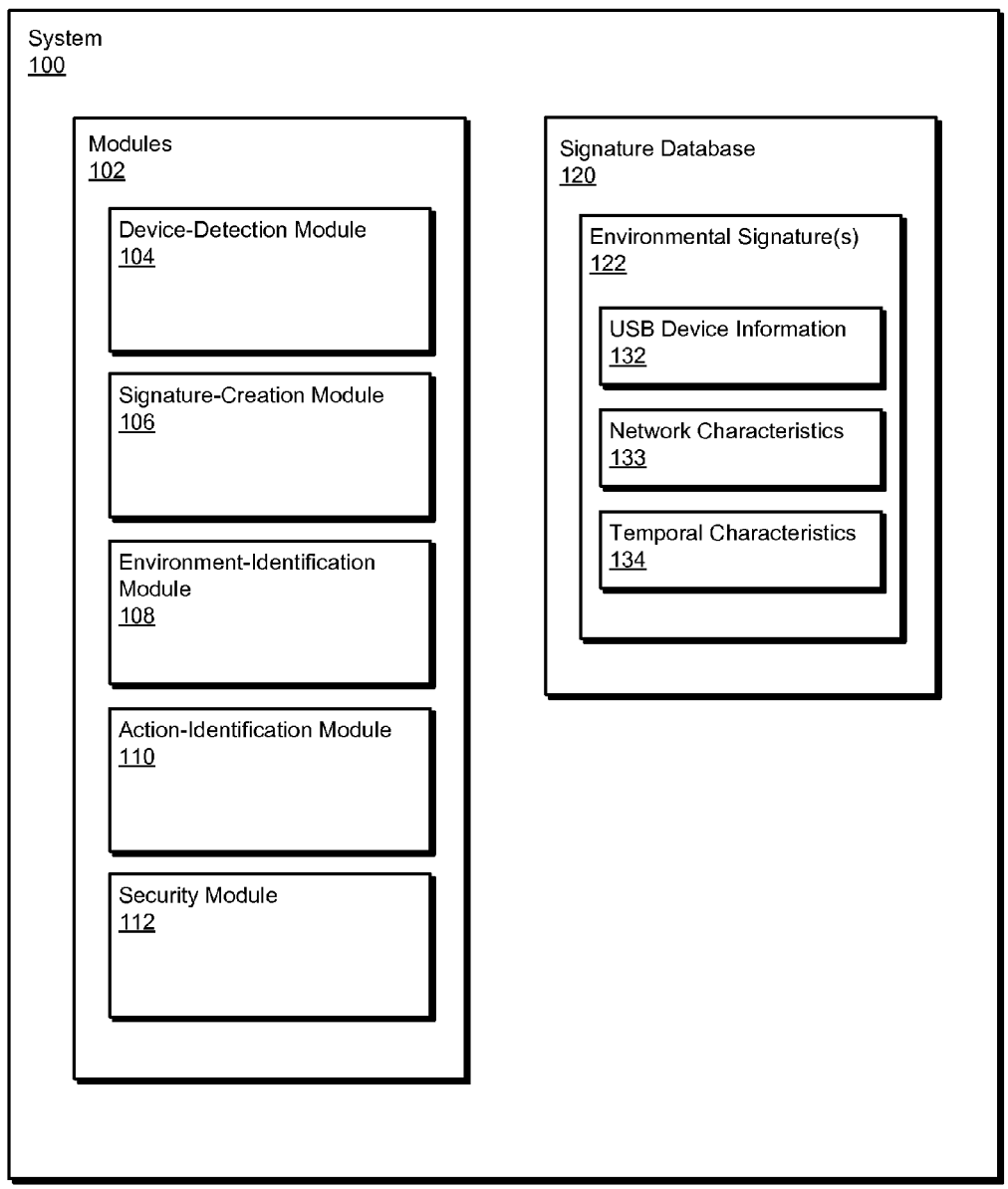
FIG. 1 is a block diagram of an exemplary system for using USB device descriptors to identify computing environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using USB device descriptors to uniquely identify the various computing environments that a computing device operates within. The term "USB device descriptor," as used herein, generally refers to any type or form of information that may identify, or be used to identify, a peripheral device, such as a USB device.

Figure 2:
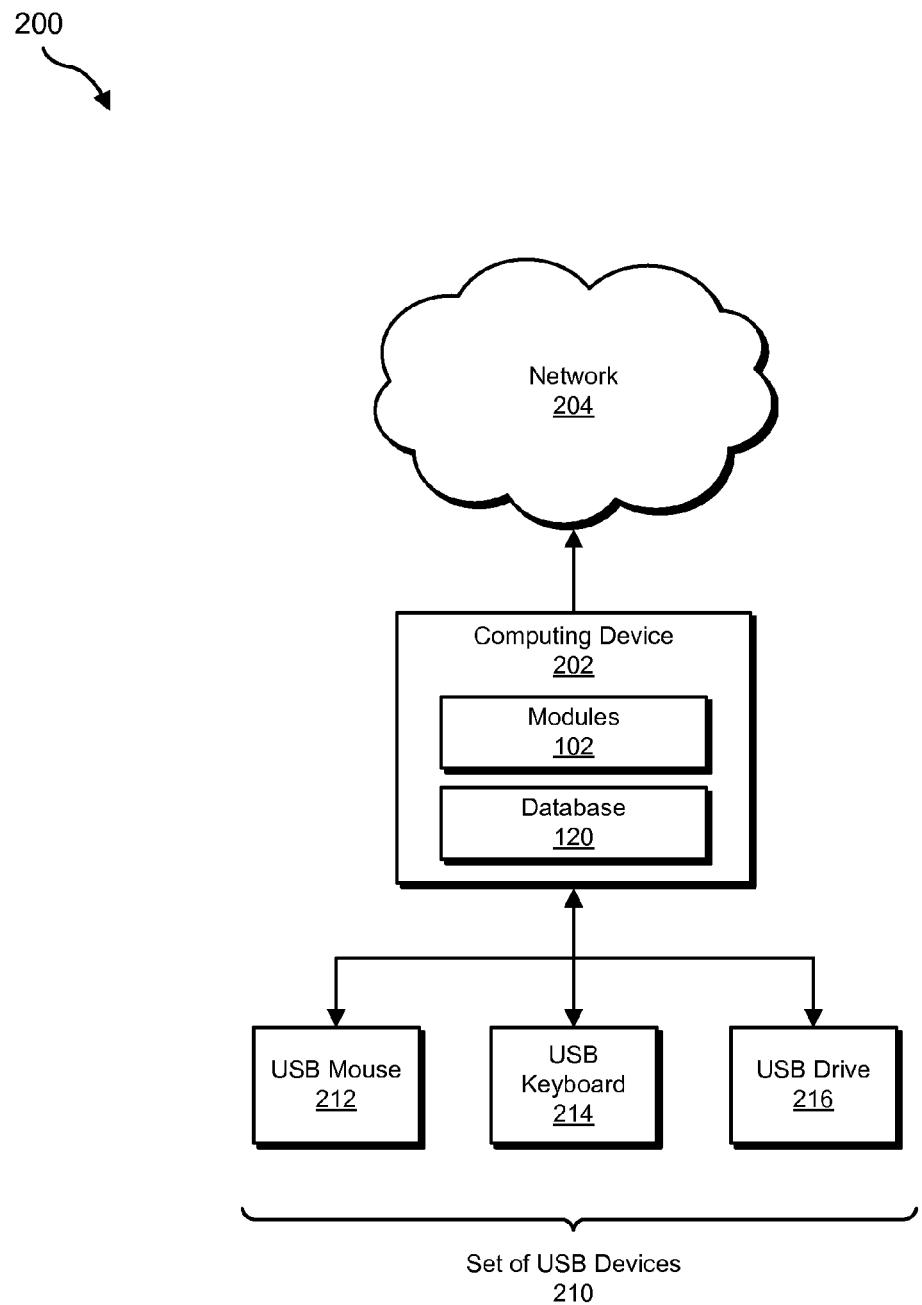
FIG. 2 is a block diagram of an exemplary system for using USB device descriptors to identify computing environments.

The following will provide, with reference to FIGS. 1-2, detailed descriptions of exemplary systems for using USB device descriptors to identify computing environments. Detailed descriptions of corresponding computer-implemented methods will also be provided in connection with FIGS. 3-8. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for using USB device descriptors to identify computing environments. As illustrated in this figure, exemplary system 100 may include one or more modules 102 for performing one or more tasks. For example, and as will be explained in greater detail below, exemplary system 100 may include a device-detection module 104 programmed to detect USB devices connected to a computing device and obtain USB device descriptors for the same. Exemplary system 100 may also include a signature-creation module 106 programmed to create environmental signatures for computing environments based at least in part on the USB device descriptors of connected USB devices.

In addition, and as will be described in greater detail below, exemplary system 100 may include an environment-identification module 108 programmed to uniquely identify computing environments based at least in part on the USB device descriptors obtained from connected USB devices. Exemplary system 100 may also include an action-identification module 110 programmed to identify and perform computing actions that are applicable to these identified computing environments. In addition, exemplary system 100 may include a security module 112 programmed to perform a security action upon determining that a detected computing-environment change represents a potential security risk. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIGS. 2 and 8 (e.g., computing device 202), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases. In one embodiment, exemplary system 100 may include a security database 120 for storing environmental signatures 122 for various computing environments. As will be described in greater detail below, these environmental signatures 122 may include information that identifies: 1) the various USB devices connected to a computing device within a particular computing environment (USB device information 132), 2) various network characteristics of a computing environment (network characteristics 133), and/or various temporal characteristics associated with a computing environment (temporal characteristics 134).

Security database 120 may represent portions of a single database or computing device or a plurality of databases or computing devices. For example, security database 120 may represent a portion of computing device 202 in FIG. 2, computing system 910 in FIG. 9, and/or portions of exemplary network architecture 1000 in FIG. 10. Alternatively, security database 120 in FIG. 1 may represent one or more physically separate devices capable of being accessed by a computing device, such as computing device 202 in FIG. 2, computing system 910 in FIG. 9, and/or portions of exemplary network architecture 1000 in FIG. 10.

Exemplary system 100 in FIG. 1 may be deployed in a variety of ways. For example, exemplary system 100 may represent a portion of a computing device, such as computing device 202 deployed within computing environment 200 in FIG. 2. As shown in FIG. 2, computing device 202 may be in communication with network 204. In one embodiment, and as will be described in greater detail below, modules 102 from system 100 in FIG. 1 may program computing device 202: 1) detect a set of USB devices connected to computing device 202 (e.g., USB devices 210) within computing environment 200, 2) obtain a USB device descriptor from each USB device 210 connected to computing device 202, and then 3) create, based at least in part on the USB device descriptors, a unique environmental signature for computing environment 200.

In some examples, computing device 202 may later use this environmental signature to uniquely identify computing environment 200. For example, at a subsequent point in time, modules 102 from system 100 in FIG. 1 may program computing device 202 to identify computing environment 200 by: 1) detecting a set of USB devices (such as USB devices 210) connected to computing device 202, 2) obtaining a USB device descriptor for each USB device 210 connected to computing device 202, and then 3) identify computing environment 200 based at least in part on the USB device descriptors. In some examples, modules 102 may also program computing device 202 to identify and then perform a computing action that is applicable to the identified computing environment (e.g., computing environment 200).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 910 in FIG. 9, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 1000 in FIG. 10, or the like. Network 204 may facilitate communication or data transfer using wireless or wired connections. In one embodiment, network 204 may facilitate communication between computing device 202 and a server, such as exemplary security server 206 in FIG. 8, as detailed below.

Figure 3:
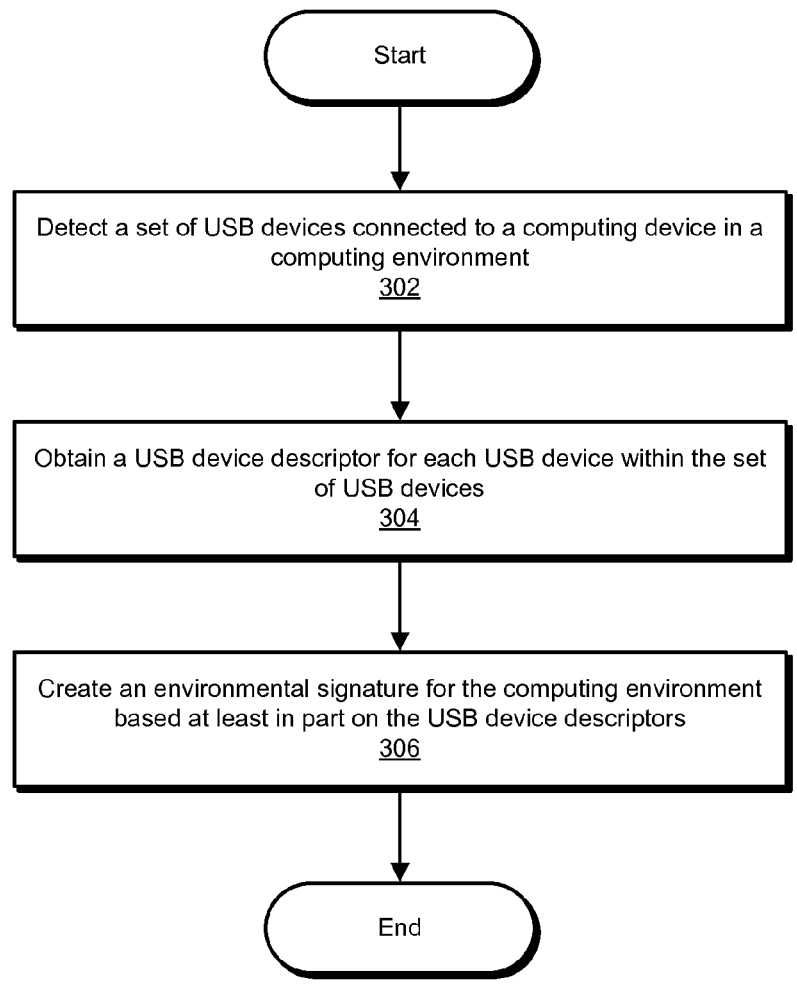
FIG. 3 is a flow diagram of an exemplary method for using USB device descriptors to identify computing environments.

FIG. 3 is a flow diagram of an exemplary computer-implemented method 300 for using USB device descriptors to identify computing environments. The steps shown in FIG. 3 may be performed by any suitable computer-executable code and/or computing system. In some embodiments, the steps shown in FIG. 3 may be performed by one or more of the components of system 100 in FIG. 1 and/or computing environment 200 in FIG. 2.

As illustrated in FIG. 3, at step 302 one or more of the systems described herein may detect a set of USB devices connected to a computing device within a computing environment. For example, device-detection module 104 in FIG. 1 (which may, as detailed above, represent a portion of computing device 202 in FIG. 2) may detect a set of USB devices 210 (i.e., USB mouse 212, USB keyboard 214, and USB drive 216) connected to computing device 202.

Device-detection module 104 may detect USB devices connected to a computing device in a variety of ways. For example, device-detection module 104 may detect USB devices connected to computing device 202 using a variety of programming languages, scripts, system calls, APIs, filter drivers, or the like, without limitation.

A "set" of USB devices, as used herein, may refer to a single USB device or a plurality of USB devices. As such, device-detection module 104 may detect a single or a plurality of USB devices connected to the computing device in step 302.

In some examples, step 302 may also include identifying when each USB device within the set of USB devices connects to and disconnects from the computing device. For example, device-detection module 104 may identify the date and time when each of USB devices 210 connect to and disconnect from computing device 202. As will be explained in greater detail below, in some examples device-detection module 104 and signature-creation module 106 may, by tracking and logging this information over a period of time (e.g., days or weeks), identify a recurring temporal pattern followed by computing device 202 when connecting to computing environment 200. For example, device-detection module 104 may, by tracking and logging the date and time when USB devices 210 connect to computing device 202, determine that computing device 202 typically connects to computing environment 200 during typical business hours (e.g., from 9 am to 5 pm, Monday through Friday). In this example, computing environment 200 may represent a user's work environment.

At step 304, the systems described herein may obtain a USB device descriptor for each USB device within the set of USB devices detected in step 302. For example, device-detection module 104 in FIG. 1 may obtain a USB device descriptor for each of USB devices 210 in FIG. 2 (e.g., USB mouse 212, USB keyboard 214, and USB drive 216).

As detailed above, the term "USB device descriptor" may refer to any type or form of information that may identify, or be used to identify, a peripheral device, such as a USB device. Examples of the types of information that may be contained with USB device descriptors include, without limitation, a USB specification supported by a USB device (e.g., 1.0, 2.0, or the like), a USB device class or subclass assigned to a USB device (by, e.g., the USB Implementers Forum, or "USB-IF"), a USB protocol used by a USB device, a maximum packet size supported by a USB device, a unique vendor ID assigned to a USB device (by, e.g., USB-IF), a unique product ID assigned to a USB device by its manufacturer, a device release number assigned to a USB device by its manufacturer, a unique device serial number assigned to a USB device, or the like.

As with step 302, device-detection module 104 may perform step 304 in a variety of ways. For example, as illustrated in FIG. 4, device-detection module 104 in FIG. 1 may obtain a USB device descriptor 400 from a USB mouse 212 connected to computing device 202 in FIG. 2. As illustrated in this figure, the fields "idVendor," "idProduct," and "bcdDevice" within USB device descriptor 400 may identify USB mouse 212 as a "Notebook Optical Mouse 1.8" manufactured by "MajorSoft Corporation."

Returning to FIG. 3, at step 306 the systems described herein may create an environmental signature for the current computing environment that identifies the computing environment based at least in part on the USB device descriptors obtained in step 304. For example, signature-creation module 106 in FIG. 1 (which may, as detailed above, represent a portion of computing device 202 in FIG. 2) may create an environmental signature for computing environment 200 that identifies computing environment 200 based at least in part on the USB device descriptors obtained from USB devices 210 in FIG. 2. Upon completion of step 308, exemplary method 300 in FIG. 3 may terminate.

Signature-creation module 106 may create a environmental signature for a computing environment based on USB device descriptors obtained from USB devices within the computing environment in a variety of ways. In one example, signature-creation module 106 may create an environmental signature for a computing environment that contains a copy of each USB device descriptor obtained from the USB devices connected to a computing device within the computing environment.

In another example, signature-creation module 106 may create an environmental signature for a computing environment that contains a hash of each USB device descriptor obtained from USB devices connected to a computing device within the computing environment. For example, signature-creation module 106 may: 1) create a hash of all or a portion of each USB device descriptor obtained in step 304 and then 2) store the same within an environmental signature associated with the computing environment.

FIG. 5 is an illustration of an exemplary environmental signature 500 generated for computing environment 200 in FIG. 2. As illustrated in this figure, environmental signature 500 may contain hashes of the USB device descriptors obtained from the USB devices 210 connected to computing device 202 in computing environment 200 in FIG. 2. Each of these hashes may represent a hash of all or a portion of a USB device descriptor. For example, each hash may represent a hash of the entirety of (i.e., all fields within) a USB device descriptor. Alternatively, each hash may represent a hash of select (e.g., particularly relevant) fields within a USB device descriptor, such as "idVendor," "idProduct," and/or "iSerialNumber."

In an additional embodiment, environmental signature 500 may contain a single hash of the hashes of the USB device descriptors obtained in step 304. That is, the hashes of the USB device descriptors obtained from the USB devices 210 connected to computing device 202 in computing environment 200 in FIG. 2 may be combined into a single hash, which single hash may then be stored within environmental signature 500.

In some examples, creating the environmental signature for the computing environment in step 306 may also include including, within the environmental signature, information that identifies at least one characteristic of a network associated with the computing environment. For example, signature-creation module 106 may identify, and then store within environmental signature 500 in FIG. 5, the IP address and/or MAC address of an upstream gateway accessed by computing device 202 within computing environment 200 in FIG. 2.

In addition, in some examples the environmental signature created in step 306 may contain information that identifies various temporal characteristics associated with the computing environment. As detailed above, in some examples device-detection module 104 and/or signature-creation module 106 may, by tracking and logging over a period of time (e.g., days or weeks) the date and time when each USB device connects to and disconnects from the computing device, identify a recurring temporal pattern followed by the computing device when connecting to the computing environment. For example, device-detection module 104 may, by tracking and logging the date and time when USB devices 210 connect to computing device 202, determine that computing device 202 typically connects to computing environment 200 during typical business hours (e.g., from 9 am to 5 pm, Monday through Friday). In this example, signature-creation module 106 may store information that identifies these temporal characteristics within environmental signature (e.g., "Begin Time=0904," "End Time=1656," and "Days=Monday, Tuesday, Wednesday, Thursday, and Friday").

In some examples, the environmental signature created in step 306 may uniquely identify a particular computing environment. For example, the various USB device descriptors obtained from the USB devices connected to a computing device within a particular computing environment may identify a particular combination of USB devices (e.g., USB mouse, USB keyboard, USB mic, USB drive, and USB webcam) associated with the computing environment. Moreover, because these USB device descriptors may include information (e.g., "idVendor," which identifies the manufacturer of a device, "idProduct," which identifies the specific product name and/or model number of a device, and "iSerialNumber," which may represent a unique serial number assigned to a particular USB device) that may be used to uniquely identify each individual USB device (even among USB devices of the same model), these USB device descriptors may be used to identify a unique combination of USB devices associated with a particular computing environment. This information, especially when combined with information that identifies various network and/or temporal characteristics associated with the computing environment, may result in a unique combination of properties and characteristics that may be used to create an environmental signature that may later be used to uniquely identify the computing environment, as will be discussed in greater detail below.

In some examples, exemplary method 300 in FIG. 3 may be performed in response to a request from a user of the computing device. For example, a user of computing device 202 in FIG. 2 may request the creation of an environmental signature for one or more of the user's computing environments. For example, a user may request the creation of an environmental signature for the user's work environment, satellite work environment, home environment, a friend's house, or the like.

Exemplary method 300 in FIG. 3 may also be performed automatically. For example, signature-creation module 106 may attempt to automatically identify and create environmental signatures for the various computing environments within which computing device 202 may operate based at least in part on the set of USB devices that connect to computing device 202.

Figure 6:
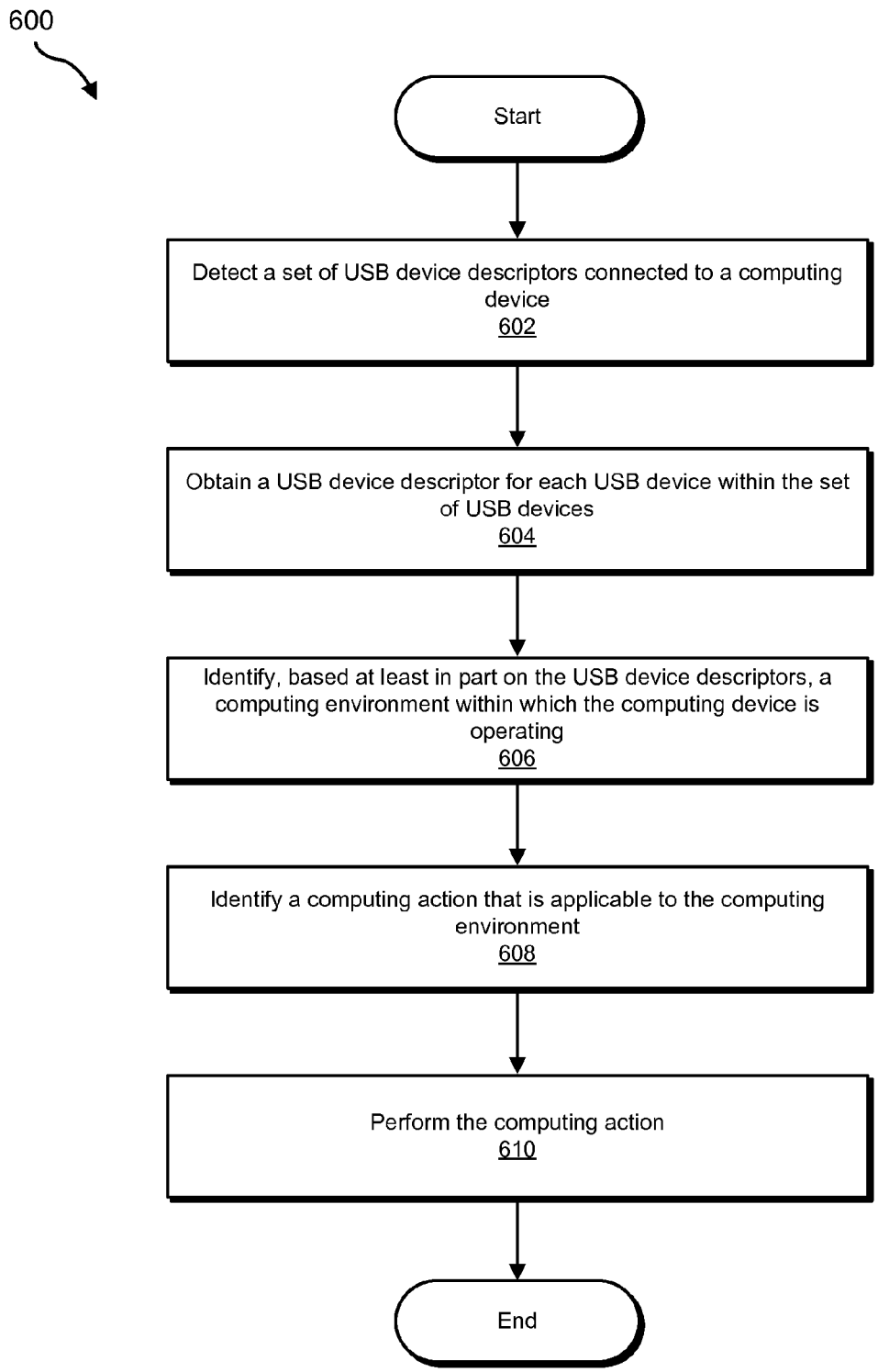
FIG. 6 is a flow diagram of an exemplary method for using USB device descriptors to identify computing environments.

As detailed above, the various systems described herein may use environmental signatures to uniquely identify computing environments. FIG. 6 is a flow diagram of a computer-implemented method 600 for performing such a task. The steps shown in FIG. 6 may be performed by any suitable computer-executable code and/or computing system. In some embodiments, the steps shown in FIG. 6 may be performed by one or more of the components of system 100 in FIG. 1 and/or computing environment 200 in FIG. 2.

As illustrated in FIG. 6, at step 602 one or more of the systems described herein may detect a set of USB device descriptors connected to a computing device. For example, upon completion of exemplary method 300 in FIG. 3, device-detection module 104 in FIG. 1 (which may, as detailed above, represent a portion of computing device 202 in FIG. 2) may, at some later point in time, detect a set of USB devices 210 connected to computing device 202.

At step 604, the systems described herein may obtain a USB device descriptor for each USB device detected in step 602. For example, device-detection module 104 may obtain USB device descriptors from each USB device 210 connected to computing device 202 in FIG. 2.

At step 606, the systems described herein may identify, based at least in part on the USB device descriptors obtained in step 604, the current computing environment within which the computing device is operating. For example, environment-identification module 108 in FIG. 1 (which may, as detailed above, represent a portion of computing device 202 in FIG. 2) may uniquely identify, by analyzing the USB device descriptors obtained from USB devices 210, computing environment 200.

Environment-identification module 108 may identify computing environments using USB device descriptors in a variety of ways. In one example, environment-identification module 108 may identify a computing environment by determining that at least a predetermined portion of the USB device descriptors obtained in step 604 are identical to USB device descriptors known to be associated with the computing environment. For example, identification module 108 may identify computing environment 200 in FIG. 2 by determining that at least a predetermined portion of the USB device descriptors obtained from USB devices 210 in step 604 are identical to USB device descriptors contained within an environmental signature (e.g., environmental signature 500 in FIG. 5) associated with computing environment 200.

In some examples, environment-identification module 108 may determine that at least a predetermined portion of the USB device descriptors obtained in step 604 are identical to USB device descriptors known to be associated with the computing environment by: 1) creating a hash of each USB device descriptor obtained in step 604 and then 2) determining that at least a predetermined portion (e.g., three out of five, or seven out of ten) of the hashes of these USB device descriptors are identical to hashes of USB device descriptors that are known to be associated with the computing environment. For example, environment-identification module 108 may determine that hashes of the USB device descriptors obtained from USB devices 210 are identical to the hashes of USB device descriptors contained within environmental signature 500 for computing environment 200 in FIG. 5.

In some examples, environment-identification module 108 may require that all of the USB device descriptors obtained in step 604 (or hashes of the same) be identical to USB device descriptors (or hashes of the same) known to be associated with a computing environment in order to successfully identify the computing environment. For example, environment-identification module 108 may only determine that a particular computing environment matches computing environment 200 if all of the hashes of the USB device descriptors obtained from the particular computing environment match or are identical to the hashes of the USB device descriptors contained within environmental signature 500 for computing environment 200 in FIG. 5. That is, the hashes of the USB device descriptors obtained from USB mouse 212, USB keyboard 214, and USB drive 216 in FIG. 2 must be identical, respectively, to the hashes contained within environmental signature 500.

Alternatively, environment-identification module 108 may only require that a predetermined portion of the USB device descriptors obtained in step 604 be identical to USB device descriptors known to be associated with the computing environment. For example, environment-identification module 108 may determine that a particular computing environment matches a known computing environment if the hashes of three out of five of the USB device descriptors obtained from the computing environment are identical to the hashes of the USB device descriptors contained within an environmental signature associated with the known computing environment.

In some examples, environment-identification module 108 may only determine that a particular computing environment matches a known computing environment if the number of USB devices within the set of USB devices detected in step 602 is greater than a predetermined minimum and/or less than a predetermined maximum. For example, if an environmental signature associated with a known computing environment contains five USB device descriptors, then environment-identification module 108 may require that a detected computing environment contain: 1) at least three USB device descriptors that are identical to the USB device descriptors associated with the known computing environment and 2) a total of at least three, but no more than ten, USB devices in order to be considered a match of the known computing environment. In one example, these conditions may prevent the production of false positives involving computing environments that contain unduly small or large numbers of USB devices.

In some examples, environment-identification module 108 may also identify a computing environment based at least in part on various network and/or temporal characteristics of the computing environment. For example, environment-identification module 108 may: 1) identify a network to which a computing device is connected and then 2) determine that at least one characteristic of the network is identical to at least one characteristic of a network associated with a known computing environment. For example, environment-identification module 108 may determine that the MAC address of an upstream gateway device within computing device 200 in FIG. 2 is identical to the MAC address of a gateway device identified within environmental signature 500 in FIG. 5.

Similarly, environment-identification module 108 may determine whether the current date and time match various temporal characteristics associated with the known computing environment. For example, environment-identification module 108 may determine whether the current date and time falls between 0904 and 1656, Monday through Friday, since these temporal characteristics are contained within environmental signature 500 in FIG. 5 for computing environment 200.

Returning to FIG. 6, at step 608 the systems described herein may identify a computing action that is applicable to the computing environment identified in step 606. For example, action-identification module 110 in FIG. 1 (which may, as detailed above, represent a portion of computing device 202 in FIG. 2) may, upon determining that computing device 202 is connected to computing environment 200 in FIG. 2, identify a computing action that is applicable to computing environment 200.

In some examples, the computing action identified in step 608 may represent a computing action that may be applicable to some, but not all, of a plurality of computing environments. Examples of the types of computing actions that may be applicable to particular computing environments include, without limitation, enabling a particular software feature (e.g., enabling a power-management feature when a computing device is connected to a user's home computing environment in which the computing device is used infrequently), disabling a software feature, modifying a software option, disabling a hardware feature (e.g., disabling a wireless card when connected to a work computing environment known to utilize a wired LAN), enabling a hardware feature, or the like.

Returning to FIG. 6, at step 610 the systems described herein may perform the computing action identified in step 608. For example, action-identification module 110 in FIG. 1 may enable or disable a software or hardware feature of computing device 202 that is applicable to computing environment 200 upon determining that computing device 202 is connected to computing environment 200 in FIG. 2. Upon completion of step 610, exemplary method 600 in FIG. 6 may terminate.

Figure 7:
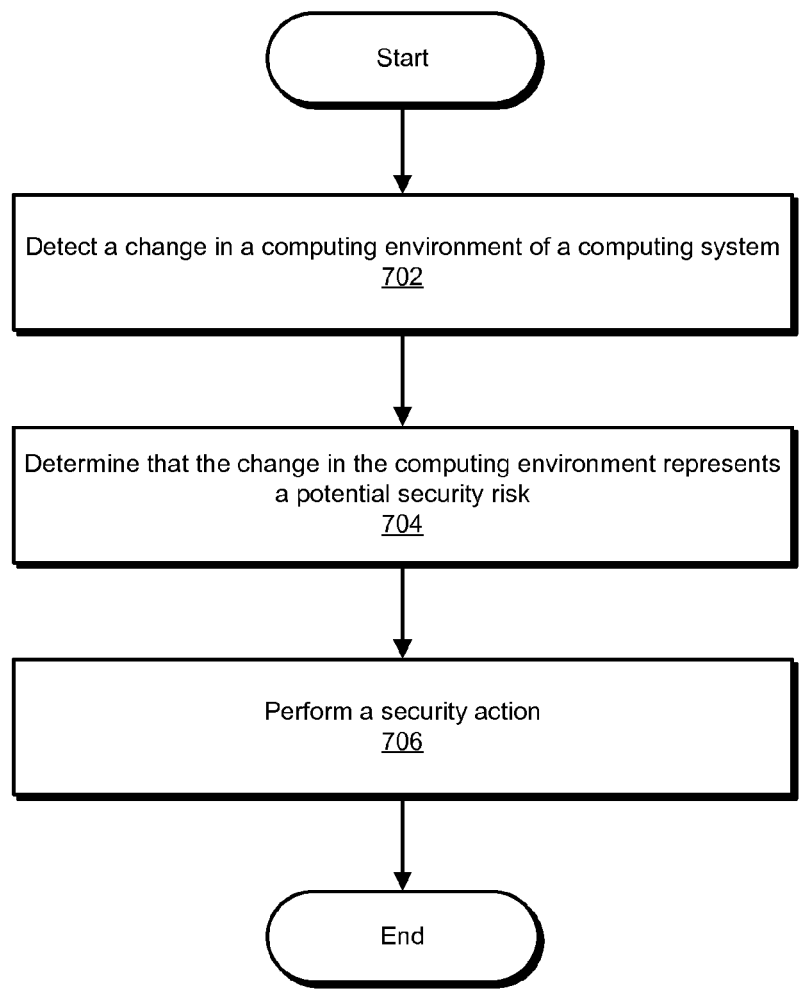
FIG. 7 is a flow diagram of an exemplary method for using USB device descriptors to detect changes to a computing environment that represent potential security risks.
Figure 8:
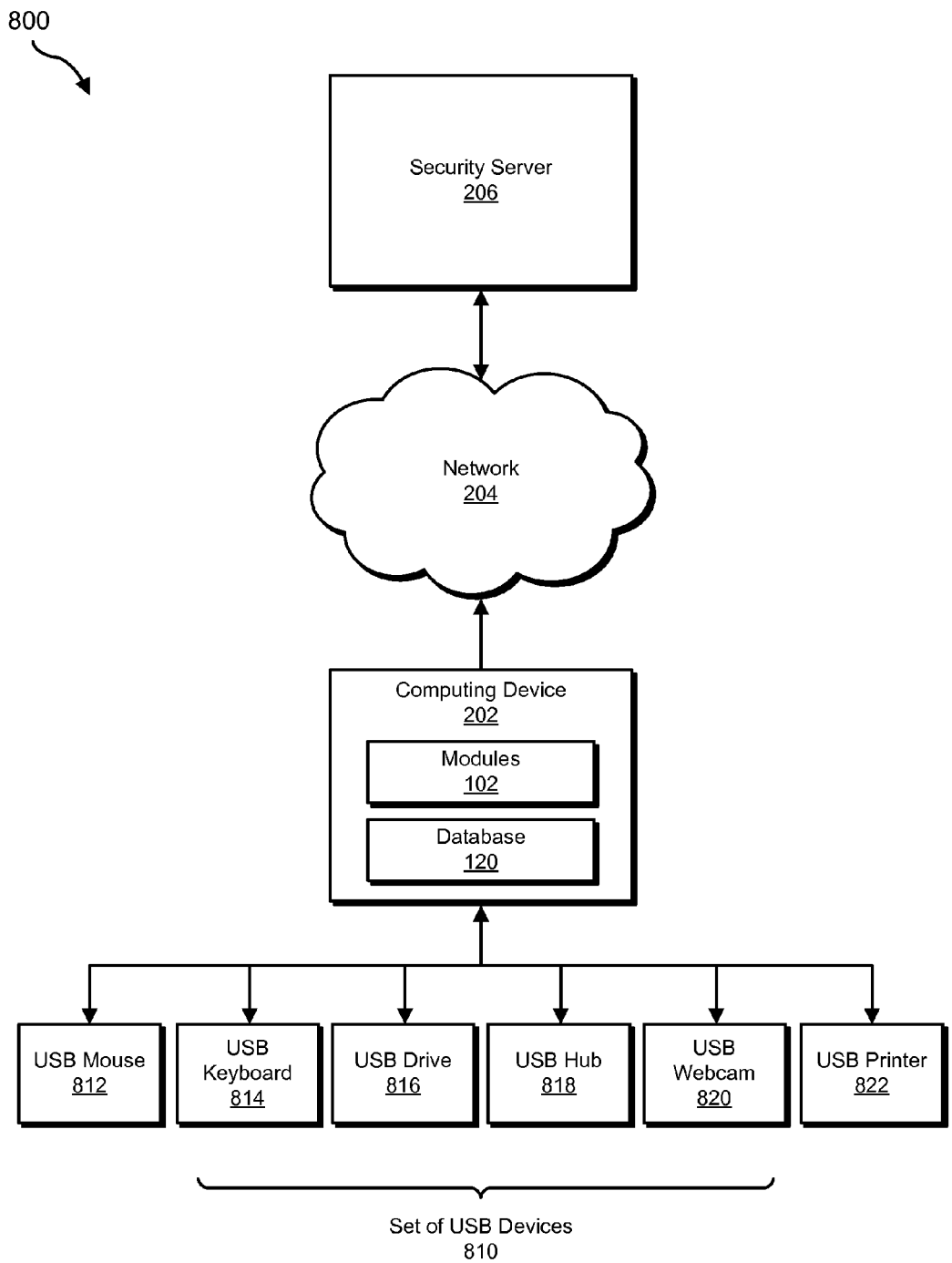
FIG. 8 is a block diagram of an exemplary system for using USB device descriptors to identify computing environments.

As detailed above, in some examples the systems and methods described herein may be used to detect potential security risks, such as when a computing device is stolen. FIG. 7 is a flow diagram of an exemplary computer-implemented method 700 for performing such a task. The steps shown in FIG. 7 may be performed by any suitable computer-executable code and/or computing system. In some embodiments, the steps shown in FIG. 7 may be performed by one or more of the components of system 100 in FIG. 1 and/or computing environment 200 in FIG. 2.

As illustrated in FIG. 7, at step 702 one or more of the exemplary systems described herein may detect a change to a computing device's computing environment. For example, environment-identification module 108 in FIG. 1 may determine that one or more additional USB devices have been connected to computing device 202 in FIG. 2 and/or one or more of USB devices 210 have been disconnected from computing device 202, as detailed above.

At step 704, the systems described herein may determine that the computing-environment change detected in step 702 represents a potential security risk. For example, environment-identification module 108 may determine, by obtaining and analyzing USB device descriptors from each of the USB devices currently connected to computing device 202, that computing device 202 has connected to an unrecognized computing environment, such as unrecognized computing environment 800 in FIG. 8.

Environment-identification module 108 may perform step 704 in a variety of ways. In one example, environment-identification module 108 may determine that computing environment 800 represents an unrecognized computing environment by: 1) obtaining USB device descriptors for each of the USB devices (USB devices 810) connected to computing device 202 and then 2) determining, by comparing these USB device descriptors with the USB device descriptors contained within each environmental signature 122 within signature database 120, that computing environment 800 fails to match any of the environmental signatures 122 contained within signature database 120 in FIG. 1.

In some examples, environment-identification module 108 may also determine that computing environment 800 represents an unrecognized computing environment by: 1) identifying various network and/or temporal characteristics associated with computing environment 800 and then 2) determining, by comparing these characteristics with the various temporal and network characteristics contained within each environmental signature 122 within signature database 120, that computing environment 800 fails to match any of the environmental signatures 122 contained within signature database 120 in FIG. 1.

Returning to FIG. 7, at step 706 the systems described herein may perform a security action. For example, security module 112 in FIG. 1 (which may, as detailed above, represent a portion of computing device 202 in FIG. 8) may, upon determining that computing device 202 has connected to unrecognized computing environment 800 in FIG. 8 (which may, as detailed above, indicate that computing device 202 has been stolen), cause computing device 202 to perform a security action.

Security module 112 may cause computing device 202 perform any type or form of security action. Examples of such security actions include, without limitation, identifying the current location of the computing device (using, for example, GPS information, IP address information, geolocation information, or the like), logging keystrokes on the computing device, capturing screenshots of activity on the computing device, monitoring processes executing on the computing device, notifying a security server (such as security server 206 in FIG. 8) that the computing device may have been stolen or compromised, providing information to a security server (e.g., security server 206 in FIG. 8) that identifies the current location of the computing device, keystrokes logged on the computing device, screenshots captured on the computing device, and/or a list of processes executing on the computing device, enabling an owner of the computing device to remotely control the computing device, encrypting sensitive data on the computing device, preventing access to sensitive data on the computing device, disabling at least one software feature on the computing device, disabling at least one hardware feature of the computing device, requiring input of a password (such as a fallback password) for continued operation of the computing device, or any other security operation that may secure or prevent unauthorized access to information stored on the computing device. Upon completion of step 706, exemplary method 700 in FIG. 7 may terminate.

As detailed above, the exemplary systems and methods described herein may uniquely identify the various computing environments that a computing device operates within by continuously obtaining, logging, and analyzing USB device descriptors from USB devices connected to the computing device. As such, these systems and methods may enable software and/or hardware vendors to enable and/or disable specific features and/or options that are only applicable to specific computing environments. Similarly, by maintaining a database of environmental signatures for known computing environments, the systems and methods described herein may enable security software to detect when a computing device has been stolen and/or perform various security operations in an attempt to secure and/or recover the stolen computing device.

Figure 9:
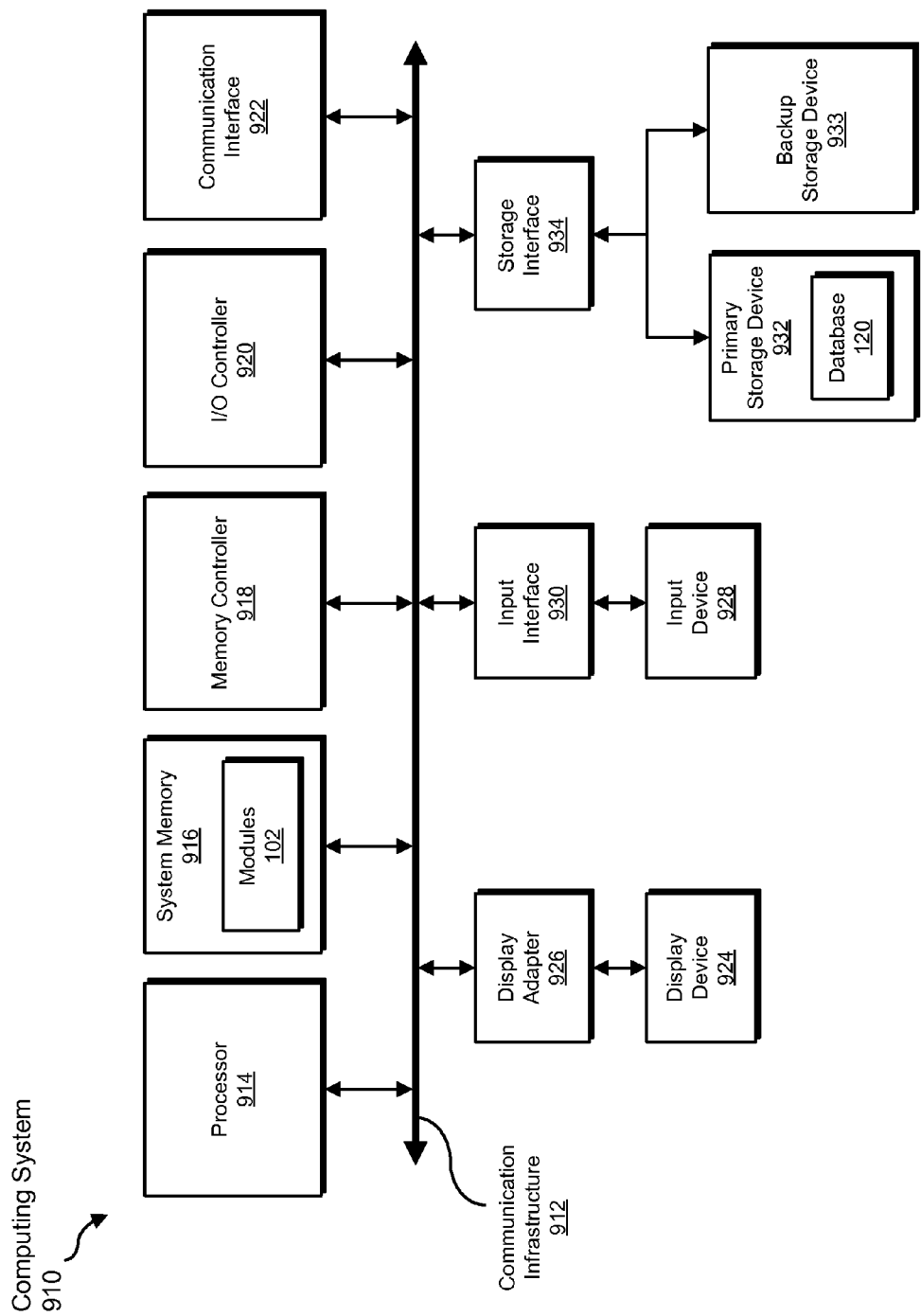
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the detecting, obtaining, creating, using, identifying, including, combining, performing, enabling, disabling, modifying, logging, capturing, monitoring, altering, providing, encrypting, preventing, and requiring steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller may perform and/or be a means for performing, either alone or in combination with other elements, one or more of the steps or features described and/or illustrated herein, such as detecting, obtaining, creating, using, identifying, including, combining, performing, enabling, disabling, modifying, logging, capturing, monitoring, altering, providing, encrypting, preventing, and requiring.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the detecting, obtaining, creating, using, identifying, including, combining, performing, enabling, disabling, modifying, logging, capturing, monitoring, altering, providing, encrypting, preventing, and requiring steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the detecting, obtaining, creating, using, identifying, including, combining, performing, enabling, disabling, modifying, logging, capturing, monitoring, altering, providing, encrypting, preventing, and requiring steps disclosed herein. Communication interface 922 may also be used to perform and/or be a means for performing other steps and features set forth in the instant disclosure.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910.

Examples of input device 928 include, without limitation, a keyboard, a pointing device, a speech recognition device, or any other input device. In at least one embodiment, input device 928 may perform and/or be a means for performing, either alone or in combination with other elements, one or more of the detecting, obtaining, creating, using, identifying, including, combining, performing, enabling, disabling, modifying, logging, capturing, monitoring, altering, providing, encrypting, preventing, and requiring steps disclosed herein. Input device 928 may also be used to perform and/or be a means for performing other steps and features set forth in the instant disclosure.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, storage devices 932 and 933 may be used, for example, to perform and/or be a means for performing, either alone or in combination with other elements, one or more of the detecting, obtaining, creating, using, identifying, including, combining, performing, enabling, disabling, modifying, logging, capturing, monitoring, altering, providing, encrypting, preventing, and requiring steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

Figure 10:
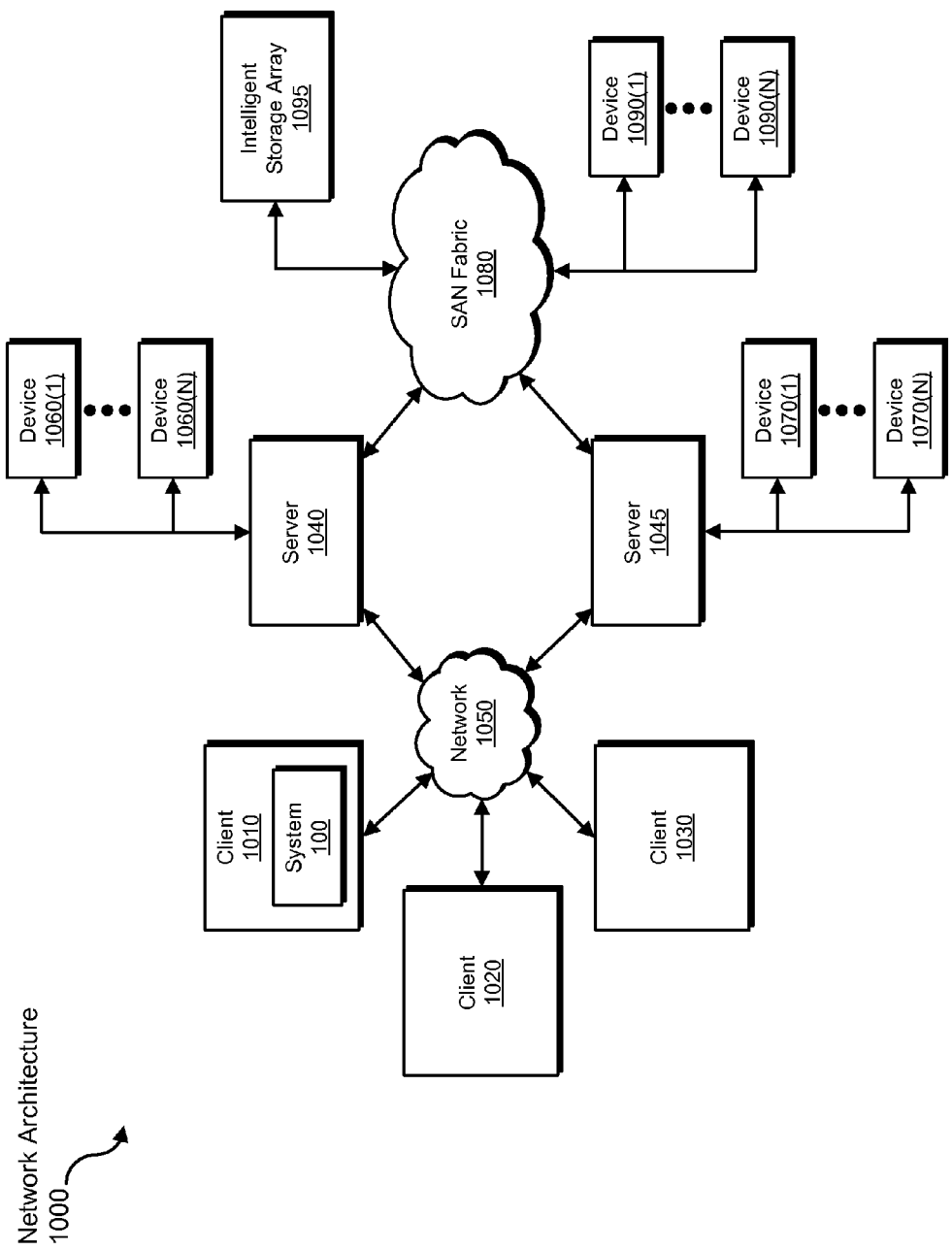
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9.

Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet. In one example, client systems 1010, 1020, and/or 1030 and/or servers 1040 and/or 1045 may include system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the detecting, obtaining, creating, using, identifying, including, combining, performing, enabling, disabling, modifying, logging, capturing, monitoring, altering, providing, encrypting, preventing, and requiring steps disclosed herein. Network architecture 1000 may also be used to perform and/or be a means for performing other steps and features set forth in the instant disclosure.

As detailed above, computing system 910 and/or one or more components of network architecture 1000 may perform and/or be a means for performing, either alone or in combination with other elements, one or more steps of an exemplary method for using USB device descriptors to identify computing environments. In one example, an exemplary method for performing such a task may include: 1) detecting a set of USB devices connected to a computing device in a computing environment, 2) obtaining a USB device descriptor for each USB device within the set of USB devices connected to the computing device, and then 3) creating an environmental signature for the computing environment that identifies the computing environment based at least in part on the USB device descriptors.

In some examples, detecting the set of USB devices connected to the computing device may include identifying when each USB device within the set of USB devices connects to and disconnects from the computing device. In this example, the method may further include identifying, by analyzing when each USB device within the set of USB devices connects to and disconnects from the computing device, a recurring temporal pattern followed by the computing device when connecting to the computing environment. In addition, the method may also involve including information that identifies the recurring temporal pattern within the environmental signature for the computing environment.

In some examples, creating the environmental signature for the computing environment may include creating a hash of each USB device descriptor and then storing the hashes of the USB device descriptors in the environmental signature for the computing environment. In this example, creating a hash of each USB device descriptor may include creating, for each USB device descriptor, a hash of the entire USB device descriptor or a hash of a portion of the USB device descriptor. In some examples, the method may also include combining the hashes of the USB device descriptors into a single hash and then storing the single hash in the environmental signature for the computing environment.

In one example, each USB device descriptor may identify a USB specification supported by a USB device, a USB device class assigned to a USB device, a USB device subclass assigned to a USB device, a USB protocol used by a USB device, a maximum packet size supported by a USB device, a vendor ID assigned to a USB device, a product ID assigned to a USB device, a device release number assigned to a USB device, and/or a device serial number assigned to a USB device.

In some examples, creating the environmental signature for the computing environment may also involve including, within the environmental signature, information that identifies at least one characteristic of a network associated with the computing environment. In addition, the method may also include performing the computer-implemented method in response to a request from a user of the computing device and/or automatically performing the computer-implemented method. In one example, one or more of the steps of this exemplary method may be embodied as computer-readable instructions on a computer-readable medium.

In an additional example, a computer-implemented method for using USB device descriptors to identify computing environments may include: 1) detecting a set of USB devices connected to a computing device, 2) obtaining a USB device descriptor for each USB device within the set of USB devices connected to the computing device, 3) identifying, based at least in part on the USB device descriptors, a computing environment within which the computing device is operating, 4) identifying a computing action that is applicable to the identified computing environment, and then 5) performing the computing action.

In some examples, identifying the computing environment may include determining that at least a predetermined portion of the USB device descriptors are identical to USB device descriptors known to be associated with the computing environment. In addition, determining that at least a predetermined portion of the USB device descriptors are identical to USB device descriptors known to be associated with the computing environment may include: 1) creating a hash of each USB device descriptor obtained from the set of USB devices connected to the computing device and then 2) determining that at least a predetermined portion of the hashes of the USB device descriptors obtained from the set of USB devices connected to the computing device are identical to hashes of USB device descriptors known to be associated with the computing environment. Moreover, identifying the computing environment may include determining that the number of USB devices within the set of USB devices connected to the computing device is greater than a predetermined minimum and/or less than a predetermined maximum.

In one example, identifying the computing environment may include: 1) identifying a network to which the computing device is connected and then 2) determining that at least one characteristic of the network is identical to at least one characteristic of a network associated with the computing environment. In addition, performing the computing action may include enabling a software feature, disabling a software feature, modifying a software option, enabling a hardware feature, and/or disabling a hardware feature.

The method may also include: 1) detecting a change in the computing environment, 2) determining that the change in the computing environment represents a potential security risk, and then 3) performing a security action. In some examples, determining that the change in the computing environment represents a potential security risk may include determining that the computing device has connected to an unrecognized computing environment.

In addition, performing the security action may include identifying the current location of the computing device, logging keystrokes on the computing device, capturing screenshots of activity on the computing device, monitoring processes executing on the computing device, altering a security server regarding the potential security risk, providing information to the security server that identifies the current location of the computing device, keystrokes logged on the computing device, screenshots captured on the computing device, and/or a list of processes executing on the computing device, enabling an owner of the computing device to remotely control the computing device, encrypting sensitive data on the computing device, preventing access to sensitive data on the computing device, disabling at least one software feature on the computing device, disabling at least one hardware feature of the computing device, and/or requiring input of a password for continued operation of the computing device. In one example, one or more of the steps of this exemplary method may be embodied as computer-readable instructions on a computer-readable medium.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In one example, all or a portion of the exemplary systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, signature-creation module 108 in FIG. 1 may transform a property or characteristic of computing device 202 in FIG. 2 by creating and storing various environmental signatures within signature database 120 in FIG. 1.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using USB device descriptors to identify computing environments, at least a portion of the method being performed by a computing device comprising at least one processor, the method comprising:
   detecting a set of USB devices connected to the computing device in a computing environment;
   obtaining a USB device descriptor for each USB device within the set of USB devices connected to the computing device;
   creating an environmental signature for the computing environment that identifies the computing environment based at least in part on the USB device descriptors;
   wherein creating the environmental signature for the computing environment comprises:
      creating a hash of each USB device descriptor;
      storing the hashes of the USB device descriptors in the environmental signature for the computing environment.

2. The method of claim 1, wherein detecting the set of USB devices connected to the computing device comprises identifying when each USB device within the set of USB devices connects to and disconnects from the computing device.

3. The method of claim 2, further comprising identifying, by analyzing when each USB device within the set of USB devices connects to and disconnects from the computing device, a recurring temporal pattern followed by the computing device when connecting to the computing environment.

4. The method of claim 3, further comprising including information that identifies the recurring temporal pattern within the environmental signature for the computing environment.

5. The method of claim 1, wherein creating a hash of each USB device descriptor comprises creating, for each USB device descriptor:
   a hash of the entire USB device descriptor; or
   a hash of a portion of the USB device descriptor.

6. The method of claim 1, wherein storing the hashes of the USB device descriptors in the environmental signature for the computing environment comprises:
   combining the hashes of the USB device descriptors into a single hash;
   storing the single hash in the environmental signature for the computing environment.

7. The method of claim 1, wherein each USB device descriptor identifies, for its respective USB device, at least one of:
   a USB specification supported by the USB device;
   a USB device class assigned to the USB device;
   a USB device subclass assigned to the USB device;
   a USB protocol used by the USB device;

a maximum packet size supported by the USB device;
a vendor ID assigned to the USB device;
a product ID assigned to the USB device;
a device release number assigned to the USB device;
a device serial number assigned to the USB device.

8. The method of claim 1, wherein creating the environmental signature for the computing environment further comprises including, within the environmental signature, information that identifies at least one characteristic of a network associated with the computing environment.

9. The method of claim 1, further comprising at least one of:
performing the computer-implemented method in response to a request from a user of the computing device;
automatically performing the computer-implemented method.

10. A computer-implemented method for using USB device descriptors to identify computing environments, at least a portion of the method being performed by a computing device comprising at least one processor, the method comprising:
detecting a set of USB devices connected to the computing device;
obtaining a USB device descriptor for each USB device within the set of USB devices connected to the computing device;
creating a hash of each USB device descriptor obtained from the set of USB devices connected to the computing device;
identifying a computing environment within which the computing device is operating by determining that at least a predetermined portion of the hashes of the USB device descriptors obtained from the set of USB devices connected to the computing device are identical to hashes of USB device descriptors known to be associated with the computing environment;
identifying a computing action that is applicable to the identified computing environment;
performing the computing action.

11. The method of claim 10, wherein identifying the computing environment further comprises determining at least one of:
that the number of USB devices within the set of USB devices connected to the computing device is greater than a predetermined minimum;
that the number of USB devices within the set of USB devices connected to the computing device is less than a predetermined maximum.

12. The method of claim 10, wherein identifying the computing environment further comprises:
identifying a network to which the computing device is connected;
determining that at least one characteristic of the network is identical to at least one characteristic of a network associated with the computing environment.

13. The method of claim 10, wherein performing the computing action comprises:
enabling a software feature;
disabling a software feature;
modifying a software option;
enabling a hardware feature;
disabling a hardware feature.

14. The method of claim 10, further comprising:
detecting a change in the computing environment;
determining that the change in the computing environment represents a potential security risk;
performing a security action.

15. The method of claim 14, wherein determining that the change in the computing environment represents a potential security risk comprises determining that the computing device has connected to an unrecognized computing environment.

16. The method of claim 14, wherein performing the security action comprises at least one of:
identifying the current location of the computing device;
logging keystrokes on the computing device;
capturing screenshots of activity on the computing device;
monitoring processes executing on the computing device;
altering a security server regarding the potential security risk;
providing information to the security server that identifies at least one of:
the current location of the computing device;
keystrokes logged on the computing device;
screenshots captured on the computing device;
a list of processes executing on the computing device;
enabling an owner of the computing device to remotely control the computing device;
encrypting sensitive data on the computing device;
preventing access to sensitive data on the computing device;
disabling at least one software feature on the computing device;
disabling at least one hardware feature of the computing device;
requiring input of a password for continued operation of the computing device.

17. A system for using USB device descriptors to identify computing environments, the system comprising:
a device-detection module programmed to:
detect a set of USB devices connected to a computing device;
obtain a USB device descriptor for each USB device within the set of USB devices connected to the computing device;
create a hash of each USB device descriptor obtained from the set of USB devices connected to the computing device;
an environment-identification module programmed to identify a computing environment within which the computing device is operating by determining that at least a predetermined portion of the hashes of the USB device descriptors obtained from the set of USB devices connected to the computing device are identical to hashes of USB device descriptors known to be associated with the computing environment;
an action-identification module programmed to:
identify a computing action that is applicable to the identified computing environment;
perform the computing action;
at least one processor configured to execute the device-detection module, the environment-identification module, and the action-identification module.

* * * * *